R. SPENCER.
Dry Amalgamator.
No. 45,188.  Patented Nov. 22, 1864.
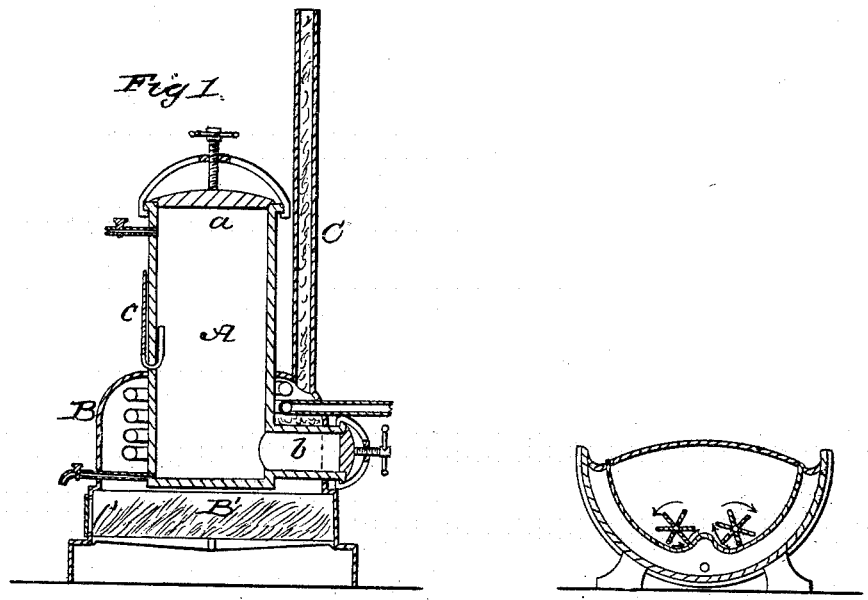
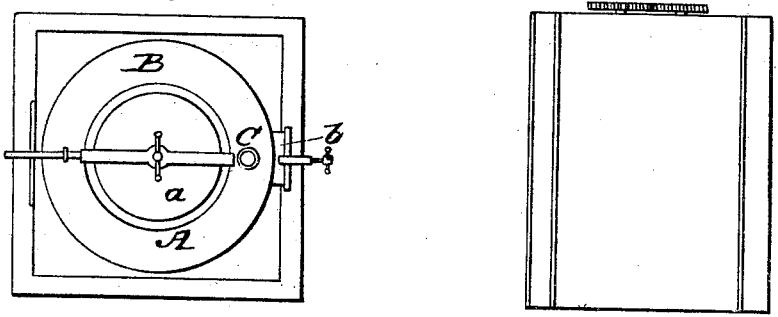
Witnesses
Ro. T. Campbell
E. Schafer
Inventor
Robert Spencer
by his atty,
Mason Fenwick & Lawrence

UNITED STATES PATENT OFFICE.

ROBERT SPENCER, OF NEW YORK, N. Y.

IMPROVED MODE OF EXTRACTING GOLD AND SILVER FROM ORES BY MEANS OF THE VAPOR OF MERCURY.

Specification forming part of Letters Patent No. 45,188, dated November 22, 1864.

*To all whom it may concern:*

Be it known that I, ROBERT SPENCER, of the city of New York, county and State of New York, have invented a new and Improved Method of Extracting Metals from Pulverized Ore; and I do hereby declare that the following is a full, clear, and exact description thereof, reference being had to the accompanying drawings, making a part of this specification, in which—

Figure 1 is a vertical section through an amalgamator by which my process may be conducted. Fig. 2 is a top view of Fig. 1.

Similar letters of reference indicate corresponding parts in both figures.

The object of this invention is to obtain a more thorough separation of the metals which will readily unite with mercury from the fine sands in which such metals are sometimes found, or from ores which have been reduced to powder by the well-known crushing machinery, also to utilize the precious metals which are to be found in the "tailings" of washing and amalgamating apparatuses hitherto used.

My invention consists in subjecting ores which have been reduced to powder to a high degree of pressure during the process of amalgamation, for the purpose of thoroughly coating every atom of the metal contained in the matrix or gangue with mercury, as will be hereinafter described.

The following is a description of my method of treating pulverized ores:

I have found by experiment that when auriferous quartz and other ores which have been reduced to powder are subjected to the action of the vapors of mercury, especially if the former be confined, under pressure, in a close vessel, the amalgamation will be more thorough, and that it will take place more rapidly than if the mercury in its ordinary liquid state is merely mixed with the ores by washing or agitation. The mercurial vapor will rise through the entire mass of powdered ore and attach itself to every particle of the metal contained therein, and hence there will be an atom of amalgam for every atom of metal in the matrix. This vaporizing process is very rapid when properly conducted, and a comparatively small amount of mercury is required for extracting a given amount of the precious metal, there being little or no loss on either side.

In the accompanying drawings I have represented one form of apparatus which will be found very convenient for carrying out my invention, although other forms and arrangements may be adopted. This apparatus consists of a very strong vessel, A, which may be made of any desired shape and capacity. Its upper end is furnished with a removable cover, $a$, which is confined in place by means of a clamp and tightening-screw for the purpose of resisting the pressure on the inside of this vessel during the amalgamating process. Near the bottom of the vessel A is an outlet-pipe, $b$, the mouth of which should be closed by a removable cover and strong clamps, as described for closing the top of said vessel. A mercurial gage, $c$, may be applied to the vessel A, as shown in Fig. 1, for indicating the pressure therein and preventing explosion in consequence of the pressure becoming too great for the strength of the vessel.

B represents a jacket surrounding the lower portion of the vessel A, and forming a fire-chamber above the main fuel-chamber B', so that the flame and products of combustion will impinge upon the sides as well as the bottom of the vessel, and thus heat it very rapidly, the smoke, &c., passing out through the chimney C.

Before commencing the process of amalgamation, a certain quantity of mercury is put into the vessel A, after which this vessel is nearly filled with the sand or powdered matrix containing the particles of metal to be amalgamated. The vessel is now closed tightly and the cover luted, so as to prevent any escape of mercurial vapor. A fire being made under this charged vessel A, the mercury therein will soon begin to vaporize and the vapors to permeate the mass of powdered matrix, enveloping every atom thereof and coating the fine spangles or grains of the metal with an amalgam. This process may be continued until the gage indicates that the pressure in the vessel A has attained the highest point which the latter will bear with safety, when the fire should be removed and the vapors of mercury allowed to condense before the discharge-pipe $b$ is opened for the removal of the contents of the vessel.

If desirable, a safety-valve may be applied to the vessel A to prevent accident from explosion, and this valve may be left open for a short time at the commencement of the process, for admitting of the escape of any sulphur which might be mixed with the matrix.

After the process of amalgamation, the contents of the vessel are removed and the metals separated from its matrix by any of the well-known washing processes.

I have represented in Fig. 1 a machine for washing and separating the metals from the matrix or gangue, which I intend shall form the subject of another application for a patent. This machine consists, essentially, of a horizontal vessel or trough having double walls and a centrally-ridged bottom, on each side of the ridge of which is arranged a rotating stirrer. These stirrers are rotated in opposite directions toward said ridge, and they toss the matrix from one side to the other over this ridge, and thus thoroughly expose the particles of mineral to the action of water, which latter may be warmed before entering the washer by means of a coil of pipe arranged within the fire-chamber of my amalgamator, or otherwise suitably arranged within a fire-chamber. The sand and finer particles of mineral may be conducted off by means of narrow gutters applied at the upper edges of the washer, as represented in the drawings.

Near the top of vessel A a pipe may be applied for conducting off the excess of vapor after the operation of amalgamation, and at the bottom of said vessel another pipe is applied for conducting off the fluid mercury and portions of amalgam before the contents of the vessel A are removed.

Having thus described my invention, what I claim as new, and desire to secure by Letters Patent, is—

Subjecting ores, while under pressure and in a disintegrated state, to the action of the fumes or vapors of mercury, substantially as and for the purposes herein described.

2. Desulphurating and also exposing ores to the action of the fumes of mercury in a single chamber, substantially as described.

ROBT. SPENCER.

Witnesses:
R. T. CAMPBELL,
E. SCHAFER.